United States Patent Office 3,314,911
Patented Apr. 18, 1967

3,314,911
COLLOIDAL SILICA CONTAINING LATICES OF HYDROFORMYLATED POLYMERS OF CONJUGATED DIENES
Neville Leverne Cull, Atlantic Highlands, N.J., assignor to Esso Research and Engineering Company, a corporation of Delaware
No Drawing. Filed June 24, 1964, Ser. No. 377,473
3 Claims. (Cl. 260—29.7)

This invention relates to coating compositions and more particularly to improved films from latex paints. In a still more specific aspect the invention is directed to latex paints prepared from hydroxylated and hydroformylated liquid diolefin polymers.

It is known to prepare latices of liquid polymers and copolymers of conjugated diolefins. For example, U.S. Patent No. 2,976,163 to Bitting et al. teaches the preparation of water-reducible paints and varnishes by emulsifying in the absence of a solvent an oily polymer of 60 to 100% butadiene-1,3 and 0 to 40% styrene with 2 to 5% of a polyoxyethylated nonyl phenol while U.S. Patent No. 2,996,395 to Jackson teaches the preparation of a similar composition by mixing a dispersion of protein with a dispersion of the same polymer using fatty acid soaps as an emulsifier. Similarly, U.S. Patent No. 2,873,199 to McKay describes the preparation of latices of oxidized diolefin polymers by emulsifying them with a mixture of sodium lauryl sulfate and a polyether alkylated phenol. When such techniques are applied to hydroxylated or hydroformylated diolefin polymers, the latices possess excellent color and odor and are stable for extended periods of time under wide variations of treatment and handling. Unfortunately, however, films laid down from these latices are wrinkled and blotchy and/or often badly eyeholed.

The present invention, therefore, resides in the discovery that the post blending of a polyoxyethylated alkyl phenol non-ionic emulsifier and a colloidal silica into a latex of a hydroxylated or hydroformylated diolefin polymer prepared with an anionic emulsifier eliminates the above described deficiencies and gives smooth continuous films.

Thus, the present invention comprises a water-reducible emulsion coating composition which contains the following ingredients:

(1) An organic polymer oil film-forming material having the characteristics of a varnish.
(2) An anionic emulsifier.
(3) A post added non-ionic emulsifier.
(4) Water.
(5) A post added colloidal silica.

Each of these will be discussed separately below.

*1.—The polymer film-forming material*

The film-forming materials are hydroformylated products of liquid unsatuarted conjugated diolefin polymers having molecular weights of from about 300 to 20,000 and wherein about 5 to 100% of the unsaturation has been replaced with —CH$_2$OH and/or —CHO groups. The hydroformylation is accomplished by reacting the liquid diolefinic polymer with carbon monoxide and hydrogen in the presence of a hydrocarbon soluble complex which contains a transition metal selected from Group VIII of the Periodic Chart in complex bond with at least one ligand consisting of a carbon monoxide molecule and at least one biphyllic ligand which contains an atom selected from Group VA of the Periodic Chart of the elements.

The polymers to be hydroformylated are obtained by copolymerizing 60 to 100 parts of butadiene-1,3 with 40 to 0 parts of styrene, preferably about 75 to 85 parts of the former and 25 to 15 parts of the latter, the polymerization being carried out at 20 to 100° C., preferably below the melting point of the catalyst or between 65 and 85° C., in a reaction diluent. Temperatures near the lower end of the range set forth are generally more suitable for batch polymerizations and temperatures near the upper end of the range are particularly suited for continuous operation. As a polymerization catalyst about 0.1 to 10 parts, preferably about 1 to 3 parts of a finely dispersed metallic sodium catalyst is used in the optional presence of various polymerization modifiers which tend to promote the reaction and produce colorless products of more exactly reproducible drying rates. As reaction diluent it is desirable to use, for example, a naphtha having a boiling range between about 90 and 120° C. or straight-run mineral spirits such as Varsol (boiling range 150 to 200° C.), inert hydrocarbon diluents such as butane, xylene, benzene, toluene, cyclohexane or the like, individually or in admixture with each other. To be suitable for the polymerization reaction here involved, the diluents should have a boiling range within the limits of about −15° C. and 200° C. The diluents are usually used in amounts ranging from 50 to 500, preferably 200 to 300 parts per 100 parts of monomers.

Instead of using inert diluents, it is also possible to use modifying diluents such as butene-2, or other low boiling olefins which modify the reaction by limited copolymerization and chain termination. Various ethers having more than two carbon atoms per molecule such as diethyl ether, diisopropyl ether, dioxane, vinyl ethyl ether, vinyl isopropyl, vinyl isobutyl ether, anisole, phenetole and other ethers of various types are also useful as diluents and are particularly helpful as co-diluents to insure formation of colorless products when used in amounts ranging from about 10 to 35 parts per 100 parts of monomers, together with the aforesaid amount of inert diluent such as solvent naphtha, p-dioxane, m-dioxane, and their various methyl and ethyl homologues are particularly preferred. In selecting the ether co-diluent it is especially desirable to select an ether having a boiling point at least 10° C. below the lower limit of the boiling range of the hydrocarbon diluent and thus, when using Varsol, ether co-diluents boiling between about 25 and 140° C. are preferred in order to permit its ready recovery from the polymerized reaction mixture.

Other means of modifying the properties of the polymer product involve the substitution of all or at least part of the butadiene feed with other diolefins such as isoprene, 2,3-dimethyl butadiene-1,3, piperylene or 2-methyl pentadiene-1,3. Likewise, styrene may be replaced by its various ring-alkylated homologues such as the various methyl styrenes, dimethyl styrenes, ethyl styrenes or diethyl styrenes. In particular it is desirable to add the styrene monomer to the reaction mixture only after the polymerization of the butadiene has been initiated. By this expedient, the induction period is quite substantially reduced, and the polymer produced is gel-free and of desirably low viscosity as opposed to a more viscous product obtained when the styrene monomer is present in the reaction mixture from the beginning.

Especially where a coarse dispersion of sodium is used as catalyst, it is also advantageous to use about 1 to 50%, preferably 10 to 20% based on sodium of a $C_1$ to $C_5$ aliphatic alcohol. Secondary and tertiary alcohols, particularly isopropanol or tertiary butanol are preferred. Such alcohols act as polymerization promoters and, depending on the degree of catalyst dispersion, have a more or less pronounced effect on the intrinsic viscosity of the resulting product. The reaction time and induction period also vary depending on the degree of catalyst dispersion and reaction temperature, the reaction time ranging from about 40 hours with a coarse catalyst at about 50° C. to about 15 minutes at about 100° C. with a catalyst particle size of less than 100 microns diameter. While sodium is preferred, similar catalysts such as potassium, sodium hydride, and various alloys of sodium are also useful. Agitation of the reaction mixture during synthesis increases the efficiency of the catalyst. Conversions of 50 to 100% on monomers can be accomplished fairly readily in batch-type as well as in continuous polymerizations, although the catalyst requirements are twice or three times greater for continuous operation than for a batch operation and equal conversion.

Destruction of catalyst at the end of the reaction is effectively accomplished by adding to the reactor a moderate excess of alcohol, e.g. 100% excess of isopropanol based on sodium, and agitating at the reaction temperature for another half hour or so. After destruction of the residual sodium by alcohol the crude product containing the alcoholate, excess alcohol and other solid impurities is cooled, neutralized with dry carbon dioxide, glacial acetic acid or other preferably anhydrous acid which does not affect the polymer, and the neutralized product is then filtered with a filter aid such as silica gel, clay, charcoal or its equivalent.

In the preferred modification the clear colorless filtrate is then fractionally distilled to remove first the alcohol-hydrocarbon azeotropes and then the dioxane-hydrocarbon azeotropes. Finally, if the polymerization is carried out in a relatively large amount of hydrocarbon diluent so that the resulting polymer solution is too dilute for use as a varnish or enamel base, it is desirable to distill off additional hydrocarbon until a product containing the desired non-volatile matter is obtained, e.g. 50–90% NVM, the non-volatile matter being the polymeric drying oil. The resulting product, being a solution of polymeric drying oil in a suitable hydrocarbon solvent such as solvent naphtha or mineral spirits, is a clear, colorless varnish composition having a viscosity between about 0.5 to 5 poises at 50% non-volatile matter.

These polymers are then hydroformylated by reacting them with carbon monoxide and hydrogen in the presence of a hydrocarbon soluble complex which contains a transition metal selected from Group VIII of the Periodic Chart, e.g. cobalt, in complex bond with at least one ligand consisting of a carbon monoxide molecule, and at least one biphyllic ligand which contains an atom selected from Group VA of the Periodic Chart of the elements, e.g. phosphorus. The preferred forms of the hydrocarbon soluble complexes employed in the preparation of the polymers employed in the instant invention are represented by the formulae:

(1) $\qquad [Co_2(CO)_6(PR_3)_2]$
and
(2) $\qquad [(C_nH_{2n-1})Co(CO)_y(PR_3)]_x$ where R is a radical containing about 1 to 6 carbon atoms and is selected from the group consisting of alkyl and alkoxy and in formula (2) $n$ is an integer of from 3 to 6, $x$ is 1 or 2, and $y$ is 1 or 2, with the proviso that when $x$ is 1, then $y$ is 2 and when $x$ is 2, then $y$ is 1. Complexes conforming to the above formulae and containing the alkyl and alkoxy radicals defined above are referred to herein as "phosphine" and "phosphite" catalyst complexes respectively.

The polymers are generally hydroformylated in an inert hydrocarbon medium which may be either paraffinic or aromatic-type solvents, the latter being preferred. The polymer may also be hydroformylated without a diluent.

In general, the hydrocarbon soluble complexes used as catalysts to produce the polymers used in the process of the present invention are oxo-type catalysts and can be broadly represented by the following formulae:

(3) $\qquad [M_2(CO)_6(BR_3)_2]$
and (4) $\qquad [(R')M(CO)_y(BR_3)]_x$ where in both formula (3) and formula (4) M is a transition metal selected from the group consisting of iron, cobalt, and rhodium, and preferably is cobalt; B is a Group VA atom selected from the group consisting of phosphorus and arsenic, and preferably is phosphorus; R is an alkyl or alkoxy radical containing from 1 to about 20, and preferably 1 to 6 carbon atoms and in formula (4) R' represents a pi-bonded conjugated diolefin or allylic structure containing 3 to 6 carbon atoms; $x$ is 1 or 2 and $y$ is 1 or 2 with the proviso that when $x$ is 1 then $y$ is 2, and when $x$ is 2 then $y$ is 1.

The preferred forms of the complexes employed to produce the polymers employed in the present invention, however, are represented by formulae (1) and (2) as hereinbefore defined and which are set forth again as follows:

(1) $\qquad [Co_2(CO)_6(PR_3)_2]$
and
(2) $\qquad [(C_nH_{2n-1})Co(CO)_y(PR_3)]_x$ where in both formula (1) and formula (2), R is an alkyl or alkoxy radical containing from 1 to 6 carbon atoms, and in formula (2), $n$ is an integer from 3 to 6, and $x$ and $y$ are as defined above.

Preparation of the complexes employed to produce the polymers of the present invention is described more fully in copending applications, Serial No. 256,258 and Serial No. 256,260 of Mertzweiller and Tenney, both filed February 5, 1963. It should be understood, however, that the scope of the instant application should be in no way restricted in view of the above disclosures.

In broad terms, the hydroformylation reaction employed to produce the polymers treated in the present invention is effected by intimately contacting the olefinic hydrocarbon polymer with carbon monoxide and hydrogen in the presence of a complex as hereinbefore described at hydroformylation temperature and pressure. The particular conditions selected to be employed will be dependent on the reaction product desired. For example, a wide variety of hydroformylated products may be produced by such practice which are characterized by at least three variables, viz (1) hydroxyl group content, (2) carbonyl (aldehyde) group content, and (3) residual unsaturation content. Thus, control of the type of functionality and unsaturation may be achieved by the specific catalyst and reaction condition employed, i.e. temperature, $H_2$ and CO partial pressure, etc.

The reaction may be performed at pressures of from 100 to 3000 p.s.i.g., preferably 500 to 1500 p.s.i.g. Higher pressure, of course, may be employed if desired.

The reaction temperatures employed are in the range of from 200° F. to 500° F., preferably 300° F. to 400° F.

The reaction time is from 30 minutes to 5 hours, preferably 1 to 2 hours.

The molar ratio of hydrogen to carbon monoxide is not especially critical and may be varied to some extent. Suitably, the ratio employed will be at least 1:1. It has been found, however, that by increasing the $H_2/CO$ ratio to 3:1, the rate of reaction, as well as the yield of carbonylated product, may be increased. Although ratios up to 10:1 or higher may be employed, the ratio will normally be in the range of 1/1 to 3/1.

Ratios of complex to polymer to be hydroformylated may be varied from 0.1 to 10 weight percent, based on transition metal, or so as to achieve a homogeneous solution. Generally, larger quantities of catalyst complex will produce a higher reaction rate; however, an amount of complex so as to supply 2.5% by weight or less of cobalt based on the polymer is preferable, and from 0.01 to 0.2 weight percent of cobalt, based on polymer, is especially preferable for the process of the present invention.

It is within the ambit of the instant invention to provide for the use of a completely hydroxylated polymer, that is one containing 2-30 hydroxyl groups/molecule, with the unsaturated polycarboxylic acid or anhydride. Such hydroxylated polymer may be produced by utilizing a two-stage process in which process conditions in the first stage are set to maximize oxonation and minimize hydrogenation of the starting polymer, followed by a second stage operating under hydrogenation conditions. Hence, in accordance with the present invention such hydroxylated polymers are produced in a two-stage process which comprises reacting, in a first stage, an unsaturated hydrocarbon compound as hereinbefore described with carbon monoxide and hydrogen in the presence of a hydrocarbon soluble "phosphine" complex, that is, for example, one having the formulae:

(5) $[Co_2(CO)_6(PR_3)_2]$ and (6) $[(C_nH_{2n-1})Co(CO)_y(PR_3)]_x$ where R is an alkyl radical containing about 1 to 6 carbon atoms, $n$ is an integer of from 3 to 6 and $x$ is 1 or 2 and $y$ is 1 or 2 with the proviso that when $x$ is 1 then $y$ is 2, and when $x$ is 2 then $y$ is 1, to produce a predominately carbonylated intermediate polymer, and in a second stage, reacting said intermediate polymer with hydrogen and from 10 to 500 p.s.i.g. partial pressure of CO in the presence of a catalyst as set forth as (5) and (6) above, and recovering the resulting hydroxylated polymer.

The Periodic Chart of the elements referred to herein is that entitled as such and distributed by the Fisher Scientific Company of New York.

2.—The anionic emulsifier

The anionic emulsifiers useful in the compositions of this invention may be any of the higher fatty acid salts or soaps, or they may be the alkali metal, alkaline earth, amine or ammonium salt of organic sulfates having 8 to 14 carbon atoms or such salts of organic ethers of polyoxyethylene sulfate. Particularly excellent emulsifiers are the fatty alcohol sulfates having the formula $MRSO_4$ where M is sodium, potassium, ammonium, triethanolamine, or diethanolamine and R is lauryl, oleyl, cetyl or their ethyoxylated derivatives. Sodium lauryl sulfate is a particularly suitable example of such alcohol sulfates. Other suitable emulsifiers include the sodium or ammonium salt of nonyl phenoxy (polyethyleneoxy) sulfate, the sodium salt of the sulfate ester of polyethylene oxide adduct of tridecyl alcohol, or of dodecyl phenol. In general about 60 to 80 parts by volume of a hydrocarbon solution of the hydroformylated polymer is emulsified with about 20 to 40 parts of water in the presence of about 2 to 5 parts by weight, based on polymer, of the anionic emulsifier.

3.—The non-ionic emulsifier

The non-ionic emulsifier of this invention is a polyoxyethylated alkyl phenol having the formula $$RC_6H_4(OCH_2CH_2)_nOH$$

where R is an alkyl radical of 6 to 12 carbon atoms and $n$ is an integer of at least 8, preferably 9 to 100. Expressed another way, the ethylene oxide units should represent at least 60% of the total molecular weight of the compound, preferably between 63 and 95%. These compounds are suitably prepared by condensing an alkyl phenol with ethylene oxide. If desired, the emulsifier may be used in conjunction with a fatty acid, but this is not necessary. When used the fatty acids include any of the higher fatty acids having 8 to 34 carbon atoms in the molecule. A particularly excellent commercial emulsifier falling in this definition is Igepal-630 manufactured by Antara Chemical Division, General Aniline Film Corp. This material is a polyoxyethylated nonyl phenol in which the number of ethylene oxide units is 9 and represent 63% of the total weight of the molecule.

Another excellent emulsifier is Triton X-100 which is an ethylene oxide condensation product of octyl phenol containing 8 to 10 ethylene oxide units. The amount of emulsifier must be maintained between 2 and 5% based on the total emulsion in order to obtain a stable emulsion.

4.—Water

It is preferred to use distilled water or natural soft water but most waters suitable for human consumption can be used. Hard waters may require preliminary chemical treatment to precipitate the polyvalent minerals thereof in the form of stable compounds which will remain inert to the emulsion ingredients if the precipitated compounds are left in the completed emulsion. The amount of water contained in the emulsion prior to its application as a coating material is not critical so long as there is enough water present to produce a stable water-reducible emulsion. The emulsion may then be reduced at the time of application by adding whatever water is desired to provide a good working consistency. Alternately, reduction to a solids content of about 55% is satisfactory, but greater or less reduction may be used.

5.—The colloidal silica

The alkali-stabilized colloidal silica used in a composition of this invention is characterized by containing silica in the form of particles of colloidal dimensions. Although the colloidal range includes particles having an average diameter not exceeding about 0.1 micron nor less than about 0.001 micron, it is preferred in this invention, in order to obtain maximum advantage, to use colloidal silica having an ultimate particle size not exceeding about 0.03 micron and preferably in the range from 0.01 to 0.03 micron. By "ultimate particle size" is meant the average diameter of particle present as measured by means of the electron microscope when the solution is diluted to about 0.1% $SiO_2$ with water and dried in a very thin layer deposit.

The concentration of solids in an aqueous dispersion of this invention may be widely varied, as may also the relative proportions of the organic polymer and colloidal silica. In general, it has been found that as little as 2 parts by weight of colloidal silica per 100 parts by weight of organic polymer is sufficient to provide an appreciable modification of the properties of the organic polymer dispersions.

A particularly suitable colloidal silica for use in the composition of this invention is Cab-O-Sil, a particulate and colloidal silica manufactured by The Cabot Co., Inc. with a particle size of 0.015 micron, surface area of 200 m.²/gm., and a bulk density of 2.2 lb./CF.

The advantages of this invention will be better understood from a consideration of the following experimental data which are given for the sake of illustration, but without intention of limiting the invention thereto.

EXAMPLE 1

A polymeric oil was provided from the compounds indicated herebelow:

| | Parts |
|---|---|
| Butadiene-1,3 | 100 |
| Varsol [1] | 200 |
| Dioxane | 40 |
| Isopropanol | 0.2 |
| Sodium [2] | 1.5 |

[1] Straight-run mineral spirits; API gravity, 49.1; flash, 105° F.; boiling range, 150° to 200° C.; solvent power 33-37 Kauri-butanol value (reference scale: Benzene—100 K.B. value, n-heptane 25.4 K.B. value).
[2] Dispersed to a particle size of 10 to 50 microns by means of an Eppenbach homo-mixer.

The polymerization was performed at 50° C. in a 2-liter autoclave equipped with a mechanical agitator. Complete conversion was obtained in 4.5 hours. The catalyst was destroyed and removed from the resulting crude product. The resulting polymer had a molecular weight of about 1800 and approximately 70% of its unsaturation was Type I and 30% Type II.

EXAMPLE 2

Seven hundred grams of Buton-150 (polybutadiene molecular weight of 2000) in benzene (40% NVM) were hydroformylated in two stages using tributyl phosphine modified cobalt octacarbonyl (0.09% cobalt on feed) under the following conditions.

| Process Conditions | Oxo Stage | Hydrogenation Stage |
|---|---|---|
| Temp., °F | 350–360 | 390–400 |
| Press., p.s.i.g | 1,000–1,100 | 1,400–1,500 |
| Gas | Syn. Gas | Hydrogen |
| Δ P, p.s.i.g | 1,100 | 1,900 |

At the conclusion of the hydrogenation step, 0.75 wt. percent of water was added and the product stirred for twenty minutes at 395° F.

The resulting hydroxylated polymer product after filtering gave the following analyses.

Oxygen _____ wt. percent__ 4.6
NVM _____ 40.5
Cobalt (polymer basis) _____ p.p.m__ 416

EXAMPLE 3

Emulsions were prepared from the hydroxylated polymer of Example 2 by adding the polymer as a 32% solution in benzene to equal quantities of water containing 3 p.h.r. of sodium lauryl sulfate emulsifier. Two latices (A and B) having the following properties were obtained.

|  | Raw Latex Before Stripping of Benzene | Finished Latex | |
|---|---|---|---|
|  |  | A | B |
| NVM, Wt. percent | 13.3 | 53.5 | 60.0 |
| pH | 7.5 | 7.4 | 8.0 |
| Brookfield Viscosity, c.p.s. | 5,400 | 850 | 1950 |
| Solvent content, wt. percent | | Trace | Trace |
| Particle Size | | | |
| X$_n$, microns | | .52 | .57 |
| σ | | 1.98 | 1.76 |

Films were laid down from these latices and in each case the film properties were poor in that they were rough and wrinkled (alligatored).

EXAMPLE 4

An attempt was made to overcome the film defficiencies of Example 3 by the addition of protective colloids and wetting agents to the latex. In almost all instances, no substantial improvement was obtained as shown in the following table.

TABLE I

| Additive | Remarks |
|---|---|
| None | Film blotchy. |
| 1 p.h.r. Swifts colloid 710 (protein colloid). | Do. |
| 1 p.h.r. Tamol-731 (sodium salt of carboxylated polyelectrolyte). | Wrinkled and blotchy film. |
| 7 p.h.r. polyvinylpyrollidone (PVP K60). | Do. |
| 1 p.h.r. polyvinyl alcohol (Lemol 60-98). | Fairly good film—slightly wrinkled. |
| 2 p.h.r. polyvinyl alcohol | Blotchy film. |
| 1 p.h.r. Victawet 35-B (sodium salt phosphate ester of 2-ethylhexanol). | Do. |
| 30% Polectron (130) (polyvinylpyrollidone ethyl acrylate copolymer). | Best film—still some indications of wrinkling. |

EXAMPLE 5

A copolymer of 80 parts by weight of butadiene and 20 parts of styrene was prepared according to the process of Example 1 and hydroformylated in the presence of a preformed hydrocarbon soluble catalyst prepared from 30 gms. of cobalt octacarbonyl (2.8% Co) in hexane and 3.0 gms. of triethyl phosphite under the following conditions.

| | | |
|---|---|---|
| Temperature | °F | 320–330 |
| Synthesis Gas Press | p.s.i.g | 1000–1100 |
| CO/H$_2$ Ratio | | 1/1.25 |
| Δ P (Syn. Gas) | lbs | 1300 |
| Time | hrs | 3.0 |

The product was found to contain 4.1 wt. percent oxygen, principally aldehydic by I.R., NVM of carbonylated polymer, 40.6 wt. percent Co=1750 p.p.m. (polymer basis). The resulting product was dissolved in n-benzene to make a 32% solution and emulsified with 3 p.h.r. of sodium lauryl sulfate, 0.5 parts by weight of distearylthiodipropionate was added as antioxidant. The resulting latex was white and gave the following inspections before and after removal of the solvent.

| | Raw Latex | Finished Latex |
|---|---|---|
| NVM, Wt. percent | 19.5 | 50.4 |
| pH | 7.5 | 6.9 |
| Viscosity, c.p.s.[1] | 450 | 280 |
| Solvent content, Wt. percent | | 0.35 |
| Particle size | | |
| X$_n$, Microns | 0.49 | 0.63 |
| σ | 2.42 | 2.48 |

[1] Brookfield viscosimeter No. 3 spindle 10 r.p.m. at R.T.

Films drawn down from this latex exhibited discontinuities.

EXAMPLE 6

One hundred grams of a finished latex of hydroxylated polybutadiene (Latex A of Example 3) were mixed with 2 p.h.r. of Triton X-100 (isooctyphenyl polyethylenoxy ethanol). Films were drawn on D panels and baked 30′ @ 350° F.

| | Additive | Film |
|---|---|---|
| Polymer latex | None | Poor, alligatored. |
| Do | 2 p.h.r. Triton X-100 | Alligatoring eliminated. Large number of eyeholes. |

The Triton X-100 modified latex was further modified by the addition of 2 p.h.r. of pyrogenic silica Cab-O-Sil. Films drawn from this material showed no alligatoring and eyeholing was largely eliminated.

EXAMPLE 7

A composite of hydroxylated polybutadiene latices (hydroxylated polybutadiene prepared as in Example 2) produced with various anionic emulsifiers (3 p.h.r.) was mixed with 2 p.h.r. of a non-ionic emulsifier (Triton X-100) and 2 p.h.r. of Cab-O-Sil and concentrated from 44.4% NVM to 50.6% NVM by stripping.

| | NVM | Additives | Film |
|---|---|---|---|
| Latex composite | 44.4 | None | Poor (alligatoring). |
| Do | 50.6 | 2 p.h.r. Triton X-100. 2 p.h.r. Cab-O-Sil | Good. No alligatoring or eyeholes. |

EXAMPLE 8

A latex was prepared by emulsifying a hydroxylated polybutadiene cement (NVM=27.8 wt. percent benzene solvent) using a one-inch dispersator for thirty minutes with 3 p.h.r. of sodium lauryl sulfate and 2 p.h.r. of Triton X-100 as emulsifier and a 70/30 HC/H$_2$O volume ratio. The latex was stripped to an NVM of 44.4 wt. percent. Films were drawn on D panels and baked 30′ @ 350° F. No alligatoring was noted but severe crazing of film occurred.

EXAMPLE 9

A latex was prepared as in Example 8 except that 1.67 p.h.r. of Cab-O-Sil was added in the emulsification step instead of Triton X-100. Films drawn from the material showed poor adhesion and mudcracking.

EXAMPLE 10

Cab-O-Sil was added to a finished hydroxylated latex prepared with an anionic emulsifier in amounts of 1 and 2 p.h.r.

|       | Additive            | Film               |
|-------|---------------------|--------------------|
| Latex | None                | Poor (alligatored).|
| Do    | 1 p.h.r. Cab-O-Sil  | Poor (eyeholed).   |
| Do    | 2 p.h.r. Cab-O-Sil  | Do.                |

EXAMPLE 11

The experiment of Example 3 was repeated using Triton X-100 instead of sodium lauryl sulfate as the emulsifier. A water-in-oil type emulsion resulted.

The following conclusions can be drawn from the above examples.

(1) Latices from polybutadiene prepared with anionic emulsifiers give poor films.
(2) The film problem can be solved by postblending a mixture of 2 p.h.r. Triton X-100 and 2 p.h.r. Cab-O-Sil with the finished latex.
(3) Triton X-100 alone in combination with an anionic emulsifier does not give good films.
(4) Cab-O-Sil alone in combination with an anionic emulsifier does not give good films.
(5) Triton X-100 by itself gives a water-in-oil type emulsion.

The advantages of the present invention having thus been fully set forth and specific examples of the same given, what is claimed as new and useful and desired to be secured by Letters Patent is:

1. In a method for preparing films from a hydroformylated liquid polymer of a conjugated diolefin in which the hydroformylated polymer is emulsified with an anionic emulsifier and the emulsified polymer laid down as a film, the improvement which comprises adding 2 to 5 wt. percent, based on polymer, of a polyoxyethylated alkyl phenol and at least two parts by weight of a colloidal silica per 100 parts by weight of polymer to the emulsion prior to laying it down as a film whereby smooth, wrinkle-free films are obtained.

2. The method of claim 1 in which the conjugated diolefin is butadiene-1,3.

3. The method of claim 2 in which the anionic emulsifier is a salt of a higher fatty acid.

References Cited by the Examiner

UNITED STATES PATENTS 2,574,902  11/1951  Bechtold et al. _____ 252—313
2,976,163  3/1961  Bitting et al. _____ 106—266

MURRAY TILLMAN, Primary Examiner.

J. ZIEGLER, Assistant Examiner.